(12) United States Patent (10) Patent No.: US 7,203,019 B1
Liu et al. (45) Date of Patent: Apr. 10, 2007

(54) LATCH APPARATUS FOR LATCHING AN ACTUATOR ARM ASSEMBLY IN A DISK DRIVE

(75) Inventors: Yanning Liu, Fremont, CA (US); Yanchu Xu, San Jose, CA (US); Michael McGrath, Pleasanton, CA (US); David Tung, Livermore, CA (US); Mark Heimbaugh, Pleasanton, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 11/243,815

(22) Filed: Oct. 5, 2005

Related U.S. Application Data

(60) Provisional application No. 60/678,544, filed on May 6, 2005.

(51) Int. Cl.
*G11B 21/02* (2006.01)
*G11B 21/22* (2006.01)
*G11B 5/54* (2006.01)
*G11B 5/596* (2006.01)

(52) U.S. Cl. ............................ 360/75; 360/256; 360/256.2
(58) Field of Classification Search ................. 360/256
See application file for complete search history.

(56) References Cited

U.S. PATENT DOCUMENTS

| 5,381,290 | A | | 1/1995 | Cheng | 360/105 |
|---|---|---|---|---|---|
| 5,495,376 | A | | 2/1996 | Wasson et al. | 360/105 |
| 5,528,437 | A | * | 6/1996 | Mastache | 360/256.4 |
| 5,742,453 | A | | 4/1998 | MacPherson | 360/105 |
| 6,452,753 | B1 | | 9/2002 | Hiller et al. | 360/254.7 |
| 6,480,361 | B1 | | 11/2002 | Patterson | 360/254.3 |
| 6,680,822 | B1 | | 1/2004 | Lin et al. | 360/256.4 |
| 6,704,166 | B1 | | 3/2004 | Turner et al. | 360/256 |
| 2006/0023365 | A1 | * | 2/2006 | Tokizaki et al. | 360/256.2 |

* cited by examiner

*Primary Examiner*—Andrea Wellington
*Assistant Examiner*—Jason Olson
(74) *Attorney, Agent, or Firm*—Myers Bigel Sibley & Sajovec, PA

(57) ABSTRACT

A latch apparatus is configured to latch an actuator arm assembly that can position a read/write head relative to a data storage disk in a disk drive. The latch apparatus includes a latch arm, a coil, a permanent magnet, and a latch control circuit. The latch arm is configured to be moved between a closed position that inhibits movement of the actuator arm assembly in a landing zone and an open position that does not inhibit movement of the actuator arm assembly in the landing zone. The coil is configured to generate an electromagnetic force on the latch arm responsive to a coil current. The permanent magnet is configured to generate a magnetic force on the latch arm that is substantially opposed to the electromagnetic force from the coil. The latch control circuit is configured to increase according to defined open current profiles over a defined opening time period the coil current to at least an upper defined level to cause the coil to move the latch arm from the closed position to the open position. The latch control circuit is further configured to decrease according to defined close current profiles over a defined closing time period the coil current to no more than a lower defined level to cause the permanent magnet to move the latch arm from the open position to the closed position.

25 Claims, 8 Drawing Sheets

LATCH APPARATUS FOR LATCHING AN ACTUATOR ARM ASSEMBLY IN A DISK DRIVE

RELATED APPLICATION

This application claims the benefit of and priority to U.S. Provisional Patent Application No. 60/678,544, filed May 6, 2005, the disclosure of which is hereby incorporated herein by reference as if set forth in its entirety.

FIELD OF THE INVENTION

The present invention generally relates to disk drive data storage devices and, more particularly, to methods and apparatus that latch an actuator arm assembly in a disk drive.

BACKGROUND OF THE INVENTION

Disk drives are widely used in computers and data processing systems for storing information in digital form. Conventional disk drives include a head stack assembly, one or more data storage disks and a spindle motor that rotates the storage disks. The head stack assembly includes an actuator motor and an actuator arm assembly that includes read/write heads mounted to flexure arms. The actuator motor can rotate the flexure arms and read/write heads about a pivot bearing relative to the storage disks.

The read/write heads are configured to fly upon air bearings in very close proximity to the rotating storage disks. Unfortunately, contact between the heads and the storage disks can result in damage to the storage disks and the actuator arm assembly.

In some disk drives, the actuator motor positions the heads over a landing zone on the disks as power is removed from the spindle motor. The landing zone can be a ramp that is positioned near each of the storage disks. Alternately, the landing zone can be a textured, non-data region of each of the storage disks.

However, even when the head is positioned safely in the landing zone, a sufficient force or shock to the disk drive may cause the heads to move from the landing zone onto data storage surfaces of the storage disks. Conventional disk drives attempt to address this problem with a latch that inhibits movement of the actuator arm assembly, and thus the head, relative to the storage disks during non-rotation of the storage disks.

One type of convention latch is a bi-stable latch that can be moved between a closed position and an open position. In the closed position it latches the actuator arm assembly to inhibit movement of the head from the landing zone. In the open position it allows the head to be freely moved from/to the landing zone. A bi-stable latch typically includes a coil and a permanent magnetic. The permanent magnet can maintain the latch in the closed position while the disk drive is turned off. To open the latch, a sufficient current is conducted through the coil to overcome the magnetic force of the permanent magnet and cause the latch to move to the open position. The latch is closed by removing the coil current, which allows the permanent magnetic to return the latch to the closed position. The coil current is typically generated through an open-loop control circuit without latch position feedback because a sensor for sensing latch position can be costly and add to the complexity of the latch. Accordingly, in operation the latch is alternately switched between the open position where it rests on the coil or an open position limit and the closed position where it rests on the permanent magnet or a closed position limit.

When the latch switches between the open and closed positions, the alternating contact of the latch with the coil and permanent magnet may cause undesirable noise to be generated from the disk drive. The latch switching may also cause wear to the latch and/or actuator arm assembly, which may generate loose material within the disk drive that can damage the heads, storage surface of the disks, and/or other components of the disk drive.

SUMMARY OF THE INVENTION

A disk drive includes an actuator arm assembly that can position a read/write head relative to a data storage disk. In some embodiments of the present invention, a latch apparatus is configured to latch the actuator arm assembly. The latch apparatus includes a latch arm, a coil, a permanent magnet, and a latch control circuit. The latch arm is configured to be moved between a closed position that inhibits movement of the actuator arm assembly in a landing zone and an open position that does not inhibit movement of the actuator arm assembly in the landing zone. The coil is configured to generate an electromagnetic force on the latch arm responsive to a coil current. The permanent magnet is configured to generate a magnetic force on the latch arm that is substantially opposed to the electromagnetic force from the coil. The latch control circuit is configured to increase over a defined opening time period the coil current to at least an upper defined level to cause the coil to move the latch arm from the closed position to the open position. The latch control circuit is further configured to decrease over a defined closing time period the coil current to no more than a lower defined level to cause the permanent magnet to move the latch arm from the open position to the closed position. In some embodiments, the latch control circuit controls the shape of the coil current when opening/closing the latch apparatus so that the latch arm reaches the extent of its travel with about zero velocity. Accordingly, the latch arm may not strike another portion of the latch apparatus upon reaching the open/closed position, which may avoid undesirable noise and/or wear of the latch apparatus.

In some further embodiments, the permanent magnet may be attached to the latch arm. After the latch control circuit causes the latch arm to be moved from the closed position to the open position it may maintain the latch in the open position for a defined latch-open time period before ramping-down the coil current to return the latch to the closed position.

In some further embodiments, the latch control circuit may be configured to move the latch arm from the closed position to the open position by increasing the coil current to at least a first level to accelerate the latch arm toward the open position over a first time period, and to reduce the coil current to no more than a second level that is sufficiently below the first level to cause the permanent magnet to decelerate the latch arm while the latch arm continues moving toward the open position during a second time period that follows the first time period. The latch control circuit may be further configured to repeat the increasing and subsequent decreasing of the coil current to alternately accelerate and then decelerate the latch arm until the latch arm reaches the open position.

In some further embodiments, the latch control circuit may be configured to move the latch arm from the open position to the closed position by decreasing the coil current to no more than a first level to cause the permanent magnet to accelerate the latch arm toward the closed position over a first time period, and to increase the coil current to at least a second level that is sufficiently above the first level to cause the coil to decelerate the latch arm while it continues moving toward the closed position during a second time period that follows the first time period. The latch control circuit may be further configured to repeat the decreasing and subsequent increasing of the coil current to alternately accelerate and then decelerate the latch arm until the latch arm reaches the closed position.

In some further embodiments, the latch control circuit may be configured to move the latch arm from the closed position to the open position by ramping-up the coil current at a first rate for a first time period and then further ramping-up the coil current at a second rate that is greater than the first rate for a second time period following the first time period. The latch control circuit may be configured to move the latch arm from the open position to the closed position by ramping-down the coil current at a first rate for a first time period and then further ramping-down the coil current at a second rate that is greater than the first rate for a second time period following the first time period.

In some further embodiments, the latch control circuit may be configured to determine a minimum coil current level that is sufficient to move the latch arm from the closed position to the open position. The latch control circuit may measure the minimum coil current level by varying the level of the coil current to identify a minimum level of current through the coil at which a force on the latch arm from the coil sufficiently exceeds a force on the latch arm from the permanent magnet so that the latch arm moves from the closed position adjacent to the permanent magnet to the open position adjacent to the coil. With the actuator arm assembly latched by the latch arm in the closed position to inhibit movement of the actuator arm assembly, the latch control circuit may determine when the latch arm has been moved from the closed position to the open position by commanding an actuator motor to attempt to move the actuator arm assembly away from the latch arm and monitoring a back electromotive force (back EMF) on the actuator motor while varying a level of the coil current until the back EMF and/or the integration of the back EMF increases at least a threshold amount which indicates that the latch has moved to the open position and the actuator arm assembly is being freely moved by the actuator motor.

In some further embodiments, the latch control circuit may be configured to determine a minimum coil current level that is sufficient to hold the latch arm in the open position, and to generate a hold current level based on the determined minimum coil current level. With the latch arm in the open position and with the actuator arm assembly positioned in the landing zone where it can become latched by the latch arm when the latch arm has moved to the closed position, the latch control circuit may measure the minimum coil current level by causing an actuator motor to attempt to move the actuator arm assembly away from the landing zone and to return the actuator arm assembly to the landing zone when the actuator arm assembly is successfully moved there from. The latch control circuit monitors the back EMF on the actuator motor while varying the coil current used to hold the latch arm in the open position until a minimum coil current is reached that can just maintain the latch arm in the open position so that the actuator arm assembly can be moved away from the latch arm.

In some further embodiments, the latch control circuit may be configured to determine a maximum close coil current level that causes the latch arm to move from the open position to the closed position, and configured to generate a current level that is used to close the latch apparatus based on the determined maximum close coil current level.

DETAILED DESCRIPTION OF THE INVENTION

The present invention now will be described more fully hereinafter with reference to the accompanying drawings, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the figures and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the terms "and/or" and "/" include any and all combinations of one or more of the associated listed items. It will be understood that, although the terms first, second, etc. may be used herein to describe various elements and/or regions, these elements and/or regions should not be limited by these terms. These terms are only used to distinguish one element/region from another element/region. Thus, a first element/region discussed below could be termed a second element/region without departing from the teachings of the present invention.

The present invention may be embodied in hardware and/or in software (including firmware, resident software, micro-code, etc.). Consequently, as used herein, the term "signal" may take the form of a continuous waveform and/or discrete value(s), such as digital value(s) in a memory or register.

The present invention is described below with reference to block diagrams of disk drives, disks, controllers, and operations according to various embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Figure 1:
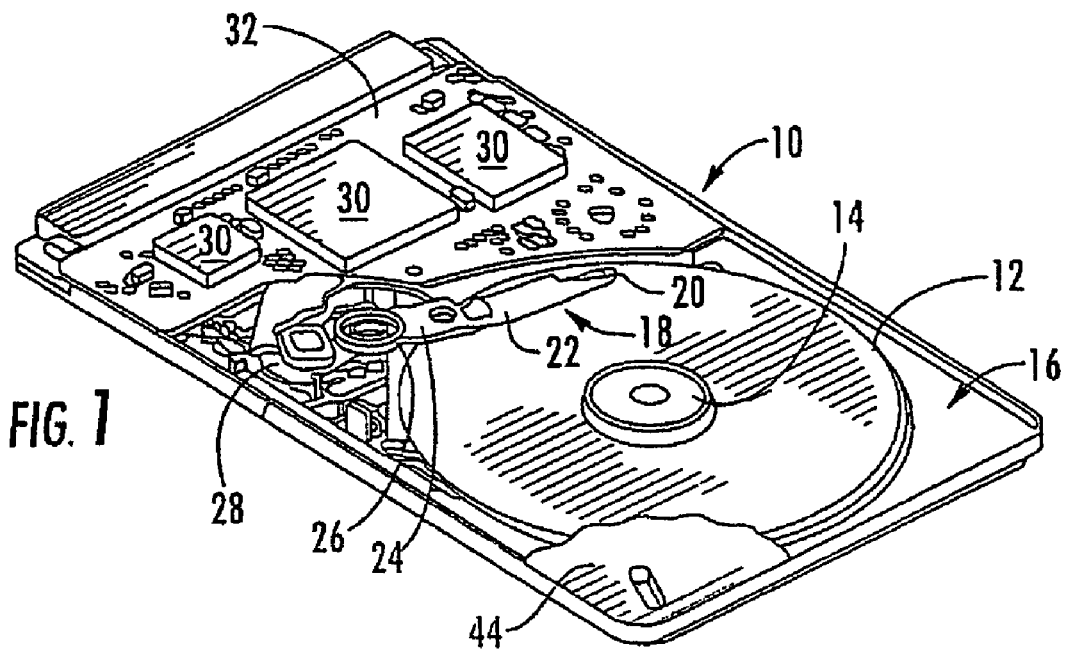
FIG. 1 is a perspective view of a disk drive with electronic circuits that are configured in accordance with some embodiments of the present invention.

A simplified diagrammatic representation of a disk drive, generally designated as 10, is illustrated in FIG. 1. The disk drive 10 includes a disk stack 12 (illustrated as a single disk in FIG. 1) that is rotated by a spindle motor 14. The spindle motor 14 is mounted to a base plate 16. An actuator arm assembly 18 is also mounted to the base plate 16. The disk drive 10 is configured to store and retrieve data responsive to write and read commands from a host. A host can include, but is not limited to, a desktop computer, a laptop computer, a personal digital assistant (PDA), a digital video recorder/player, a digital music recorder/player, and/or another electronic device that can be communicatively coupled to store and retrieve data in the disk drive 10.

The actuator arm assembly 18 includes a head 20 (or transducer) mounted to a flexure arm 22 which is attached to an actuator arm 24 that can rotate about a pivot bearing assembly 26. The head 20 may, for example, comprise an magnetoresistive (MR) element and/or a thin film inductive (TFI) element. An actuator motor 28 (e.g., a voice coil motor (VCM)) rotates the actuator arm assembly 18 to radially move the head 20 relative to the disk stack 12. The spindle motor 14 and actuator arm assembly 18 are coupled to a controller, read/write channel circuits, and other associated electronic circuits 30 which can be enclosed within one or more integrated circuit packages mounted to a printed circuit board (PCB) 32. The electronic circuits 30 may include analog and/or digital circuitry, and typically includes a digital signal processor (DSP), a microprocessor-based controller and a random access memory (RAM) device.

Figure 2:
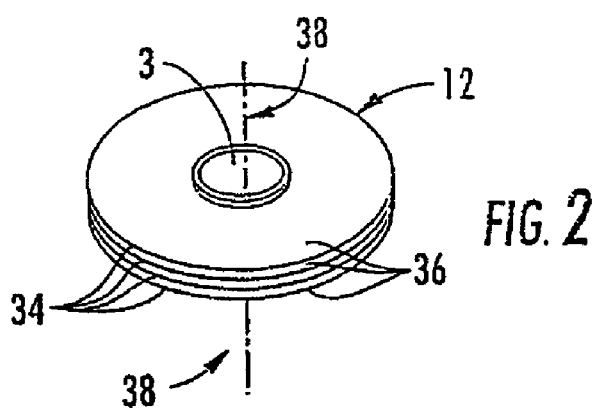
FIG. 2 is a block diagram of a disk stack having a plurality of data storage disks.

Referring now to the illustration of FIG. 2, the disk stack 12 typically includes a plurality of disks 34, each of which may have a pair of disk surfaces 36, 36. The disks 34 are mounted on a cylindrical shaft and are configured to rotate about axis 38. The spindle motor 14 as mentioned above, rotates the disk stack 12. Although the disks 34 are described as magnetic disks for purposes of illustration, they may alternatively be optical disks or any other type of rewritable data storage disk.

Figure 3:
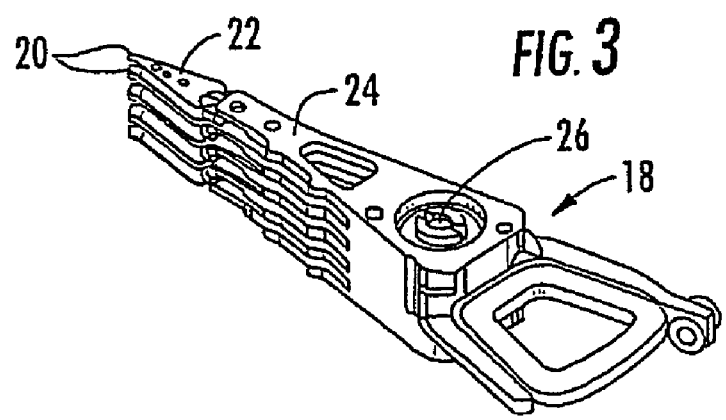
FIG. 3 is a perspective view of a portion of an actuator arm assembly having a plurality of actuator arms.

Referring now to the illustration of FIGS. 1 and 3, the actuator arm assembly 18 includes a plurality of the heads 20, each of which are adjacent to a different one of the disk surfaces 36. Each head 20 is mounted to a corresponding flexure arm 22 which is attached to a corresponding portion of the actuator arm 24 that can rotate about the pivot bearing assembly 26. The actuator motor 28 operates to move the actuator arm 24, and thus moves the heads 20 relative to their respective disk surfaces 36.

Figure 4:
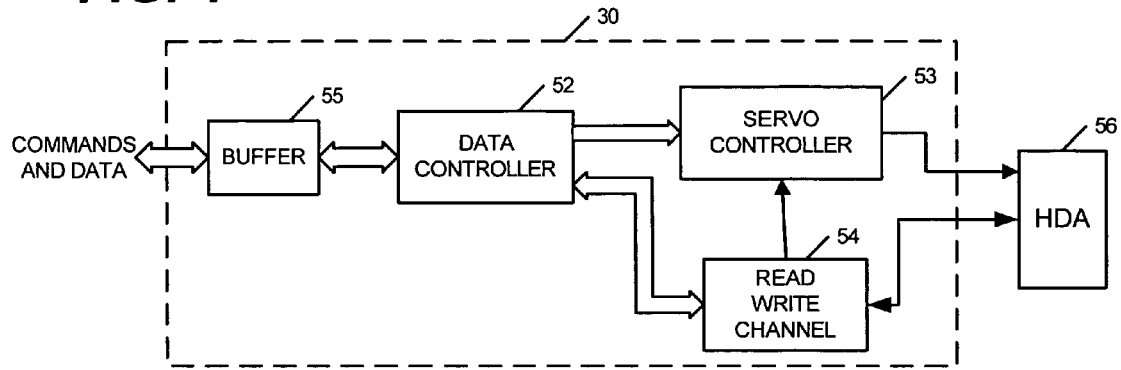
FIG. 4 is a block diagram of a portion of the controller and other electronic circuits of the disk drive shown in FIG. 1 according to some embodiments of the present invention.

Referring to FIG. 4, the electronic circuits 30 can include a data controller 52, a servo controller 53, a read write channel 54, and a buffer 55. The exemplary embodiment of the electronic circuits 30 has been illustrated with two separate controllers 52,53, buffer 55, and a read write channel 54 for purposes of illustration and discussion only. It is to be understood that the functionality that is described herein for the controllers 52,53, buffer 55, and/or the read write channel 54 may be integrated within one integrated circuit package or distributed among more than one integrated circuit package. The head disk assembly (HDA) 56 can include the actuator arm assembly 18, the disk stack 12, the actuator motor 28, and the spindle motor 14.

Write commands and associated data from a host are buffered in the buffer 55. The data controller 52 is configured to carry out buffered write commands by formatting the associated data into blocks with the appropriate header information, and to transfer the formatted data from the buffer 55, via the read/write channel 54, to LBAs on the disk 34 that are identified by the associated write command.

Figure 6:
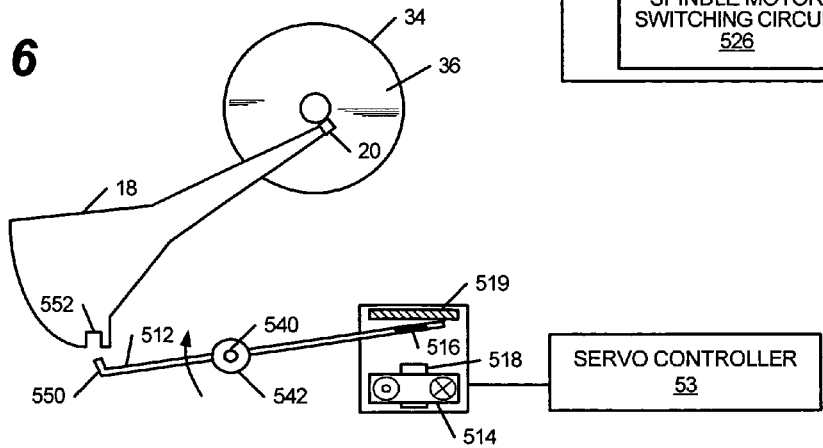
FIG. 6 is a block diagram of the servo controller and the latch apparatus of FIG. 5 but in which the actuator arm assembly is no longer latched.

The read write channel 54 can operate in a conventional manner to convert data between the digital form used by the data controller 52 and the analog form conducted through the preamplifier 60 to the heads 20 in the HDA 56 (See. FIG. 6). The read write channel 54 provides servo positional information read from the HDA 56 to the servo controller 53. The servo positional information can be used to detect the location of the head 20 in relation to LBAs on the disk 34. The servo controller 53 can use LBAs from the data controller 52 and the servo positional information to seek the head 20 to an addressed track and block on the disk 34, and to maintain the head 20 aligned with the track while data is written/read on the disk 34.

Figure 5:
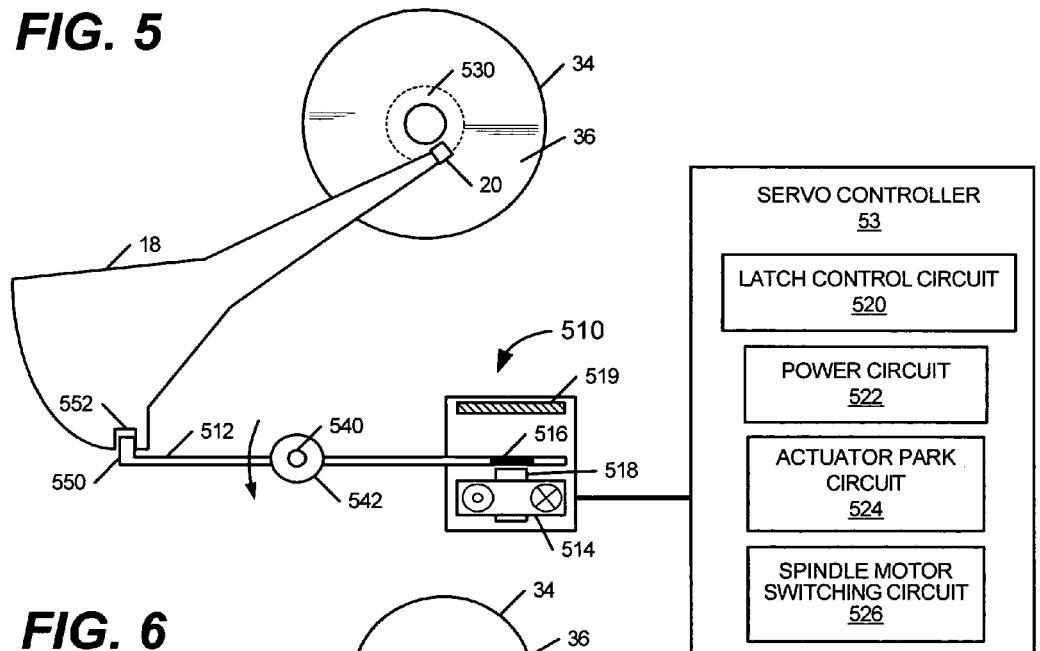
FIG. 5 is a block diagram of a servo controller and a latch apparatus that has latched an actuator arm assembly and is configured in accordance with some embodiments of the present invention.

FIG. 5 illustrates further illustrates the servo controller 53 and a latch apparatus 510 that is configured to releasably latch the actuator arm assembly 18 so that the head 20 can be selectively inhibited from moving from a landing zone 530. The latch apparatus 510 can include a latch arm 512, an electrical coil 514, a permanent magnet 516, and a latch control circuit 520. The latch apparatus 510 may further include a power circuit 522, an actuator park circuit 524, and a spindle motor switching circuit 526. The latch control circuit 520, the power circuit 522, the actuator park circuit 524, and/or the spindle motor switching circuit 526 may reside in the servo controller 53 as shown in FIG. 5.

When a loss of power to the disk drive 10 is sensed and/or when the disk drive 10 is commanded to turn-off, the actuator park circuit 524 commands the actuator motor 28 to move the actuator arm assembly 18 so that the head 20 is positioned in the landing zone 530 where it can be latched by the latch arm 512. When the head 20 is in the landing zone 530 it may rest on a ramp or a landing area on the disk 34. The landing area may correspond to, for example, a laser texture zone on each disk surface 36 that includes a laser roughened surface that can reduce stiction of the head 20 when parked (e.g., resting) thereon. When a ramp is used in the landing zone 530, it may be configured to prevent contact between the head 20 and the disk 34 when the head 20 is parked on the ramp. A ramp is typically located in a landing zone adjacent to an outer periphery of the disk 34, and a landing area is typically located in a landing zone adjacent to an inner periphery of the disk 34. Accordingly, although the landing zone 530 has been illustrated along an inner periphery of the disk, it is to be understood that it may instead by located anywhere on or adjacent to the surface 36 of the disk 34 without departing from embodiments of the present invention. Representative ramps are discussed in U.S. Pat. No. 6,452,753 and U.S. Pat. No. 6,480,361.

The spindle motor switching circuit 526 can be connected to the spindle motor 14 and configured to switch the motor 14 from acting as a driving motor for spinning the disk stack 12 to acting as a generator for powering the actuator motor 28, the actuator park circuit 524, the latch control circuit 520, other components of the servo controller 53, and/or other electronic and/or electromechanical components of the disk drive 10. The switching may be responsive to the power circuit 522 sensing loss of power to the disk drive 10.

The latch arm 512 is configured to pivot about a shaft 540 coupled to a bearing 542 and to be moved by the coil 514 and permanent magnet 516 between a closed position and an open position. The latch arm 512 is shown in FIG. 5 in the closed position where an extended portion 550 of the latch arm 512 extends into a recessed portion (e.g., slot) 552 of the actuator arm assembly 18 to retain the head 20 in the landing zone 530 where may rest on a landing area or ramp. Referring to FIG. 6, the latch arm 512 is shown in the open position where the extended portion 550 thereof does not extend into the recessed portion 552 of the actuator arm assembly 18 and, consequently, the actuator motor 28 may freely rotate the actuator arm assembly 18 to remove the head 20 from the landing zone 530. Other latching arrangements are also possible. For example, the extended portion 550 may be part of the actuator arm assembly 18 and the recessed portion 552 may be part of the latch arm 512. In a further example, the latch arm 512 and actuator arm assembly 18 may include mating groves or teeth and/or mating pins and slots.

Referring to FIGS. 5 and 6, the permanent magnet 516 may be attached to the latch arm 512. The coil 514 may extend around an iron pole 518 that is aligned with the permanent magnet 516. The permanent magnet 516 and iron pole 518 are configured to be magnetically attracted to one another so that permanent magnet 516 generates a magnetic force on the latch arm 512 that is sufficient, in the absence of at least a threshold electromagnetic force exerted thereon by the coil 514, to move the latch arm 512 toward the iron pole 518 to the closed position, where the latch arm 512 contacts the iron pole 518. The latch control circuit 520 is configured to generate a current through the coil 514 which polarizes the iron pole 518 opposite to an adjacent pole of the permanent magnet 516 so as to exert an electromagnetic force on the permanent magnet 516 and the connected latch arm 512. The illustrated circle-cross and circle-dot in the coil 514 indicate opposite directions of current flow, such in a direction out of the paper and a direction into the paper. The electromagnetic force by the coil 514 on the latch arm 512 opposes the magnetic force on the latch arm 512 by the permanent magnet 516.

Accordingly, while the disk drive 10 is turned-off, the permanent magnet 516 retains the latch arm 512 in the closed position (FIG. 5) where the latch arm 512 can, in turn, inhibit movement of the actuator arm assembly 18 from the landing zone 530. To unlatch the actuator arm assembly 18, the latch control circuit 520 generates a sufficient current through the coil 514 so that the force it generates against the latch arm 512 exceeds the force from the permanent magnet 516 and other forces, such as frictional forces between the extended portion 550 and recess portion 552 and that are associated with the shaft 540 and bearing 542, so that the latch arm 512 rotates to the open position (FIG. 6) where it contacts a crash-stop 519. The servo controller 53 can command the actuator motor 28 to move the actuator arm assembly 18 away from the landing zone 530 while the latch arm 512 is held in the open position, after which the latch control circuit 520 can stop the current through the coil 514 and allow the latch arm 512 to return to the closed position.

The latch control circuit 520 can thereby control the current through the coil 514 to cause the latch arm 512 to alternately move between the open and closed positions. The latch control circuit 520 could simply toggle the coil current between zero and a threshold level to cause the latch arm 512 to switch between open/closed positions. However, if the coil current is abruptly stopped (e.g., as with a trailing edge of a square wave current) while the latch arm 512 is in the open position (FIG. 6), the latch arm would be subject to a torque that increases rapidly as it approaches the closed position. Accordingly, the latch arm 512 would exhibit a rapidly increasing acceleration until it crashed into the iron pipe 518. Similarly, if the coil current is abruptly increased (e.g., as with a leading edge of a square wave current) above the threshold needed to overcome the magnetic force from the permanent magnet 516, the latch arm 512 in the closed position (FIG. 5) would be subjected to a rapidly increasing torque as it approached the open position until it crashed into the crash stop 519. Such alternating impact by the latch arm 512 with the crash stop 519 and iron pipe 518 may generate undesirable noise and/or increase wear of one or more of the mechanical components of the latch apparatus 510.

In accordance with some embodiments of the present invention, the latch control circuit 520 is configured to ramp-up, during a ramp-up time, the coil current to at least an upper defined level to cause the coil 514 to move the latch arm 512 from the close position to the open position. The latch control circuit 520 is further configured to ramp-down, during a ramp-down time, the coil current to no more than a lower defined level to cause the permanent magnet 516 to move the latch arm 512 from the open position to the closed position.

Figure 7:
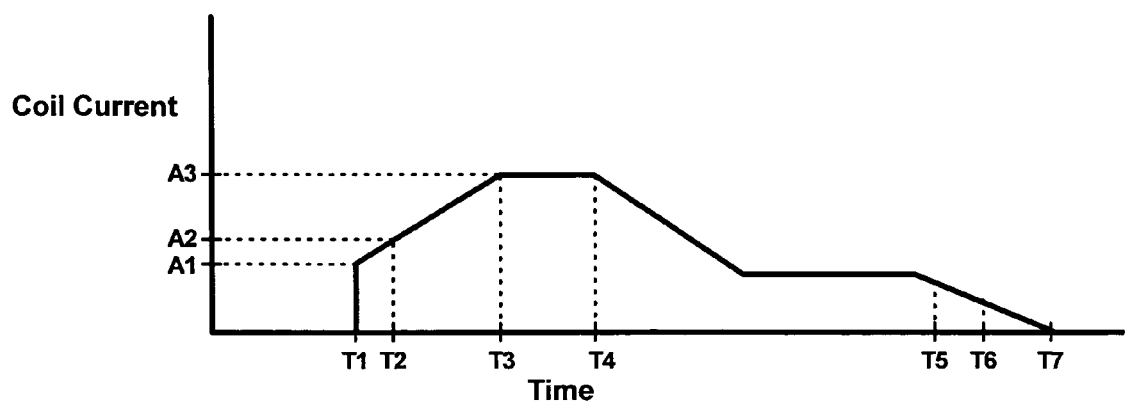
FIG. 7 is a graph that illustrates an example of how the latch control circuit may ramp-up and ramp-down of the coil current according to some embodiments of the present invention.

FIG. 7 is graph that illustrates an example of how the latch control circuit 520 may ramp-up and ramp-down of the coil current according to some embodiments of the present invention. With the latch arm 512 in the closed position, the coil current is set at time T1 to an initial level A1 that is not sufficient to cause the latch arm 512 to begin moving toward the open position (i.e., force by coil 514 is less than the force by the permanent magnet 516). The coil current is increased from the initial value A1 to an upper defined level A3 at time T3 over a ramp-up time period (T3–T1). While the coil current is slowly increasing, a threshold coil current A2 is reached at time T2 where the latch arm 512 begins moving from the closed position to the open position. The latch arm 512 can reaches the open position where it contacts the crash stop 519 before the upper defined coil current level A3 is reached at time T3.

The threshold coil current level that is needed to overcome the magnetic force and other forces that oppose movement of the latch arm 512 may change over time, such as due to variation in magnetization of the permanent magnet 516 and/or variation in frictional forces between the engaged extended portion 550 and recessed portion 552, and may vary between different disk drives due to variation in manufacturing tolerances. Accordingly, the threshold coil current level may not be precisely known by the latch control circuit 520. However, because the coil current is slowly ramped-up from below the threshold coil current level, the latch arm 512 will begin to open with the minimum threshold coil current that is needed to overcome the magnetic force and opposing forces. Although the coil current continues to increase beyond the threshold coil current A2 and eventually reaches an upper defined level A3, the latch control circuit 520 can set the ramp-up time period (T3–T1) to be much longer than the time needed for the latch arm 512 to travel between the closed and open positions. The net torque applied to the latch arm 512 during its movement to the open position can thereby be much less than if the coil current were abruptly changed to a sufficiently high value, such as the upper defined level A3, to ensure that the latch arm 512 has been moved. The upper defined level A3 of the coil current may be set by the latch control circuit 520 to a level that is expected to be sufficient to always move the latch arm 512 to the open position irrespective of manufacturing tolerances between disk drives 10 and variation in the threshold coil current level over time.

With continued reference to FIG. 7, the latch control circuit 520 maintains the coil current at the upper defined level A3 during time period T3 to T4 to ensure that the latch arm 512 has moved to the open position. The coil current level A3 is defined to be sufficiently high to ensure that a hard to open latch 510 will be opened during the time period T3 to T4. Because it can take more current to move the latch arm 512 to the open position than it does to maintain the latch arm 512 in the open position, the coil current can be reduced after the latch arm 512 is in the open position so as to reduce power consumption and heat generation by the latch 510. Accordingly, the coil current is decreased after time T4 from level A3 to a lower level that that is defined based on a minimum hold coil current that is sufficient to hold the latch arm 512 in the open position. The minimum hold coil current may be determined based on the measurements explained further below with regard to FIG. 13. The latch arm 512 is maintained in the open position for a sufficient length of time for the servo controller 53 to move the actuator arm assembly 18 away from and/or to the landing zone 530.

At time T5 the coil current is decreased to return the latch arm 512 to the closed position. The latch arm 512 reaches the closed position at time T6 where it contacts the iron pole 518 with a non-zero coil current. The coil current continues to decrease after the latch arm 512 begins to move. The latch control circuit 520 can set the ramp-down time period (T7–T5) to be much longer than the time needed for the latch arm 512 to travel from the open position to the closed position. The latch control circuit 520 may also maintain the coil current at no more than a defined minimum level (i.e., maximum close current level) until after the latch arm 512 is expected to have reached the closed position, after which it may further reduce the coil current to zero. The net torque applied to the latch arm 512 during its movement to the closed position can thereby be much less than if the coil current were abruptly halted.

The elapsed time for the latch control circuit 520 to move the latch arm 512 from the closed position to the open position and vice versa is related to the rate at which the coil current is increase and decreased. A slower rate of increase/decrease results in less torque applied to the latch arm 512 while it is moving to the open/closed position. As explained above, the threshold coil currents at which the latch arm 512 begins to open/close can vary due to such as manufacturing tolerances between different disk drives and effects of operation over time. In some embodiments of the present invention, the latch control circuit 520 changes the coil current according to a first rate (slope) for a first period of time and then increases the rate of change of the coil current at a second rate (slope) for a second period of time. The first rate may be selected to be appropriate for latch apparatuses in most disk drives, while the second rate may be sufficient to ensure that hard-to-open and/or hard-to-close latch apparatuses in other disk drives will open/close.

Figure 8:
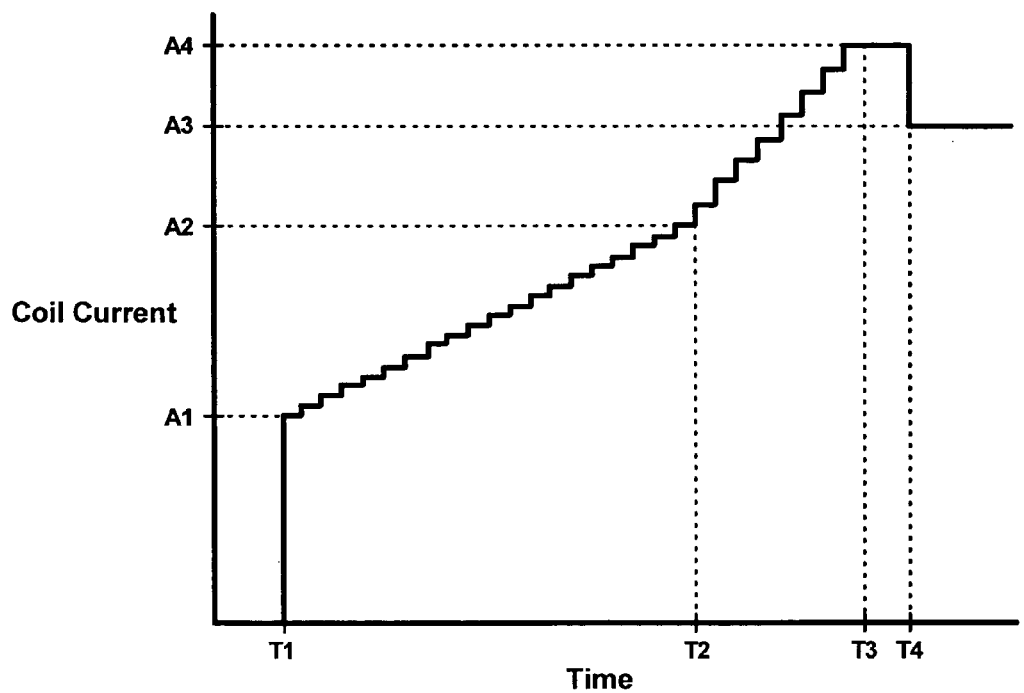
FIG. 8 is a graph that illustrates how the latch control circuit may increase the coil current at a first rate over a first period, and then further increase the coil current at a higher second rate over a second time period according to some embodiments of the present invention.

FIG. 8 is graph that illustrates how the latch control circuit 520 may increase the coil current from A1 to A2 at a first rate over a first period from T1 to T2, and then increase the coil current from A2 to A4 at a higher second rate over a second time period T2 to T3 according to some embodiments of the present invention. As shown in FIG. 8, the coil current may be ramped-up from A1 to A2 through a series of small step increases. The first rate is selected to cause typical latch apparatuses to move from the closed position to the open position. The second rate is selected to cause hard-to-open latch apparatus to move to the open position. At time T4, the latch current is lowered from level A4 to level A3 which is sufficient to hold the latch arm 512 in the open position for the hold time period while the servo controller 53 may move the actuator arm assembly 18 away from the landing zone 530. Although two different rates are shown in FIG. 8, it is to be understood that the coil current may be ramped-up and/or ramped-down using more than two rates of change. As will be appreciated, the coil current may be similarly controlled to move the latch arm 512 from the open position to the closed position by, for example, decreasing the coil current at a first rate for a first time period, followed by decreasing the coil current at a higher second rate for a second time period.

The latch control circuit 520 may further be configured to introduce a braking force on the latch arm 512 as it moves from the closed position to the open position, and/or from the open position to the closed position. In some embodiments, the latch control circuit 520 moves the latch arm 512 from the closed position to the open position by increasing the coil current to at least a first level to accelerate the latch arm 512 toward the open position over a first time period, and to then reduce the coil current to no more than a second level that is sufficiently below the first level to cause the permanent magnet 516 to decelerate the latch arm while the latch arm continues moving toward the open position during a second time period that follows the first time period. The second time period can correspond to an expected length of time for the latch arm to complete movement to the open position, after which the latch control circuit 520 may further increase the coil current during a third time period that follows the second time period to more than the first current level to ensure that the latch arm 512 is moved to the open position. The braking action may further decrease the contact force by the latch arm 512 against the iron pole 518 and crash stop 519, which may decrease the associated noise and wear on the mechanical components of the latch apparatus 510. In some embodiments, the coil current is controlled so that the velocity of the latch arm 512 is about zero when it reaches the open/closed position.

Figure 9:
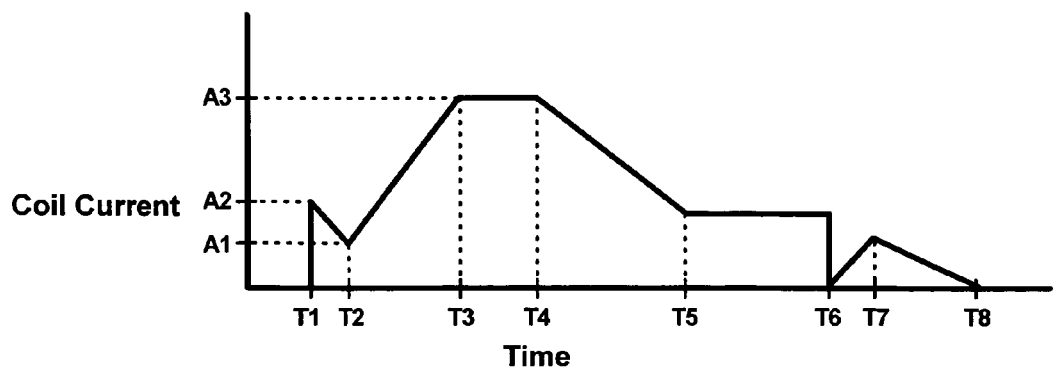
FIG. 9 is a graph that illustrates how the latch control circuit may control the coil current to cause a braking force when moving the latch arm between the open and closed positions according to some embodiments of the present invention.

FIG. 9 is graph that illustrates how the latch control circuit 520 may control the coil current to cause a braking force when moving the latch arm 512 between the open and closed positions according to some embodiments of the present invention. At time T1, with the latch arm 512 in the closed position, the coil current is abruptly increased to a level A2, which is sufficient to being accelerating the latch arm 512 toward the open position, and then is ramped downward to a level A1 during a ramp-down time period from T1 to T2. The current level A1 is selected to be sufficiently low to cause a braking force on the latch arm 512 that opposes its movement and causes it to decelerate as it approaches the open position. The ramp-down time period from T1 to T2 may be selected to be sufficiently long so that the latch arm 512 is expected to have reached the open position by the occurrence of time T2. The coil current is then ramped-up from level A1 to level A3 during a time period from time T2 to T3 to ensure that the latch arm 512 is in the open position. The coil current may be held at level A3 for a defined time to allow a hard-to-open latch arm to be moved to the open position. The coil current can then be ramped down from T4 to T5 to a lower level that is sufficient to hold the latch arm 512 in the open position to allow the actuator arm assembly 18 to be moved away from the landing zone 530.

The latch control circuit 520 begins to command the latch 510 to close at time T6. The coil current is abruptly decreased to a sufficiently low value (e.g., zero) to cause the latch arm 512 to begin accelerating toward the closed position. The coil current is then ramped upward to a level that is selected to be sufficiently high to cause a braking force on the latch arm 512 that opposes its movement and causes it to decelerate as it approaches the closed position. The ramp-up time period from about time T6 to T7 may be selected to be sufficiently long so that the latch arm 512 is expected to have reached the closed position by the occurrence of time T7. The coil current is then ramped-downward to zero during a time period from time T7 to T8 to ensure that the latch arm 512 is in the closed position.

Figure 10:
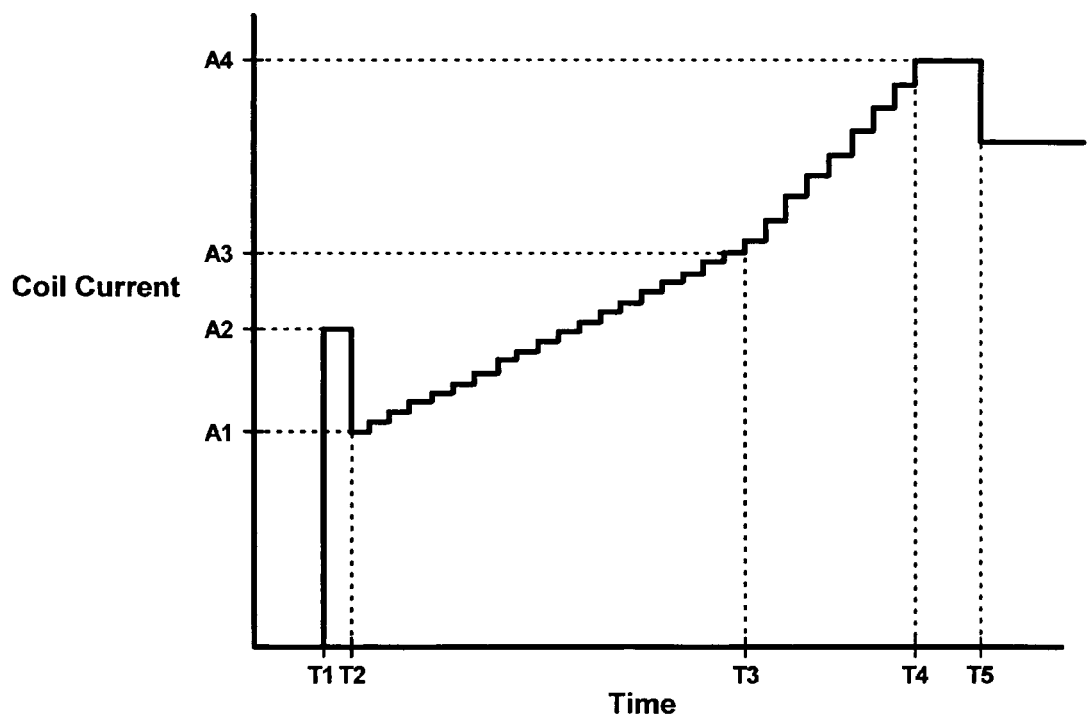
FIG. 10 is a graph that illustrates how the latch control circuit may control the coil current to cause a braking force when moving the latch arm between the closed and open positions according to some other embodiments of the present invention.

FIG. 10 is a graph that illustrates another embodiment of how the latch control circuit 520 may control the coil current to cause a braking force when moving the latch arm 512 between the closed and open positions according to some embodiments of the present invention. At time T1 the coil current is abruptly increased to level A2 which is sufficiently high to cause the latch arm 512 to begin accelerating from the closed position toward the open position. At time T2 the latch current is abruptly decreased down to level A1, and it is then ramped-up at a first rate from level A1 to level A3, which is greater than A2, over a time period from T2 to T3. The time period from T2 to T3 is sufficiently long so that the latch arm 512 is expected to reach the open position before time T3. From time T3 to time T4 the coil current is increased at a second rate, which is greater than the first rate, to a level A4 which is greater than level A3 where it is held until time T5 to ensure that the latch arm 512 has reached the open position. After time T5 the current is decreased to a lower level that is sufficient to hold the latch arm 512 in the open position, until the servo controller 53 has sufficient time to move the actuator arm assembly 18 away from the landing zone 530.

Figure 11:
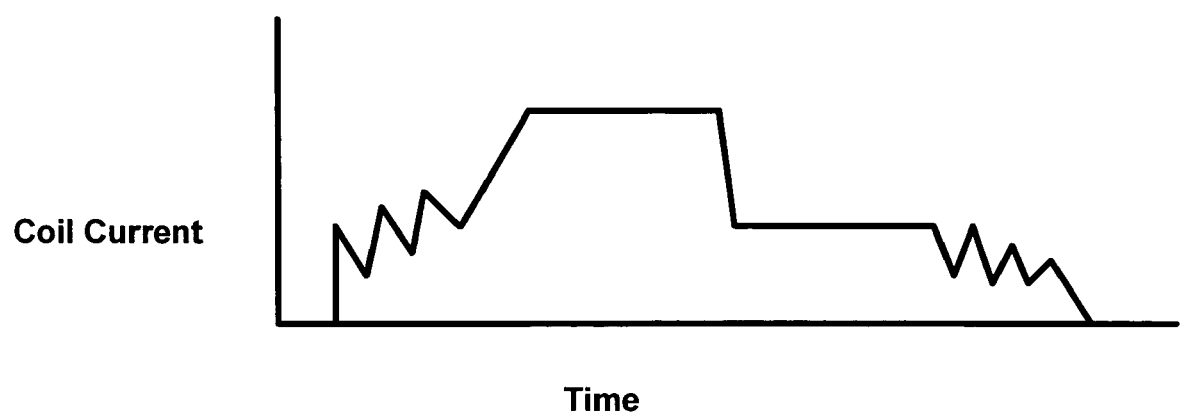
FIG. 11 is a graph that illustrates how the latch control circuit may control the coil current to cause a sequence of braking forces when moving the latch arm between the open and closed positions according to some other embodiments of the present invention.

FIG. 11 is a graph that illustrates another embodiment of how the latch control circuit 520 may control the coil current to cause a sequence of braking forces when moving the latch arm 512 between the open and closed positions according to some embodiments of the present invention. As shown, the latch arm 512 is moved from the closed position to the open position by controlling the coil current to provide a sequence of abrupt current increases to successively higher levels followed each time by a partial ramp-down to a lower level. Three such sequences are illustrated in FIG. 11. Consequently, the latch arm 512 undergoes a pattern of acceleration followed by partial deceleration until it reaches the open position. The acceleration and deceleration sequences may limit the maximum velocity achieved by the latch arm 512 while it is moving to the open position, and may provide more consistent movement control of the latch arm 512 irrespective of variations that can occur between different disk drives and which may occur over time. The latch arm 512 is held in the open position for a sufficient time to allow the actuator arm assembly 18 to be moved from the landing zone 530.

The latch arm 512 may be moved from the open position to the closed position through a similar sequence of acceleration and deceleration. For example, as shown in FIG. 11, the coil current is controlled to provide a sequence of abrupt current decreases to successively lower levels followed each time by a partial ramp-up to a higher level. Three such sequences are illustrated in FIG. 11. Consequently, the latch arm 512 undergoes a pattern of acceleration followed by partial deceleration until it reaches the closed position. Although three acceleration and deceleration sequences have been shown in FIG. 11 for the opening and closing process for the latch arm 512, it is to be understood that any number of acceleration and deceleration sequences may be carried out when moving the latch arm 512 to the open position and/or the closed position. The number of sequences may be selected by the latch control circuit 520 based on how quickly the latch arm 512 can be moved to the open position and/or the closed position, the rate of operation of the control loop within the latch control circuit 520, how much time can be tolerated for opening/closing the latch arm 512, and/or based on other factors.

The latch control circuit 520 may be further configured to determine a minimum coil current level that is sufficient to move the latch arm 512 from the closed position to the open position. This determination may be accomplished by measuring the minimum coil current level through a testing process and/or by looking up a nominal value in a table within the latch control circuit 520 based on a class identity of the latch apparatus 510.

Figure 12:
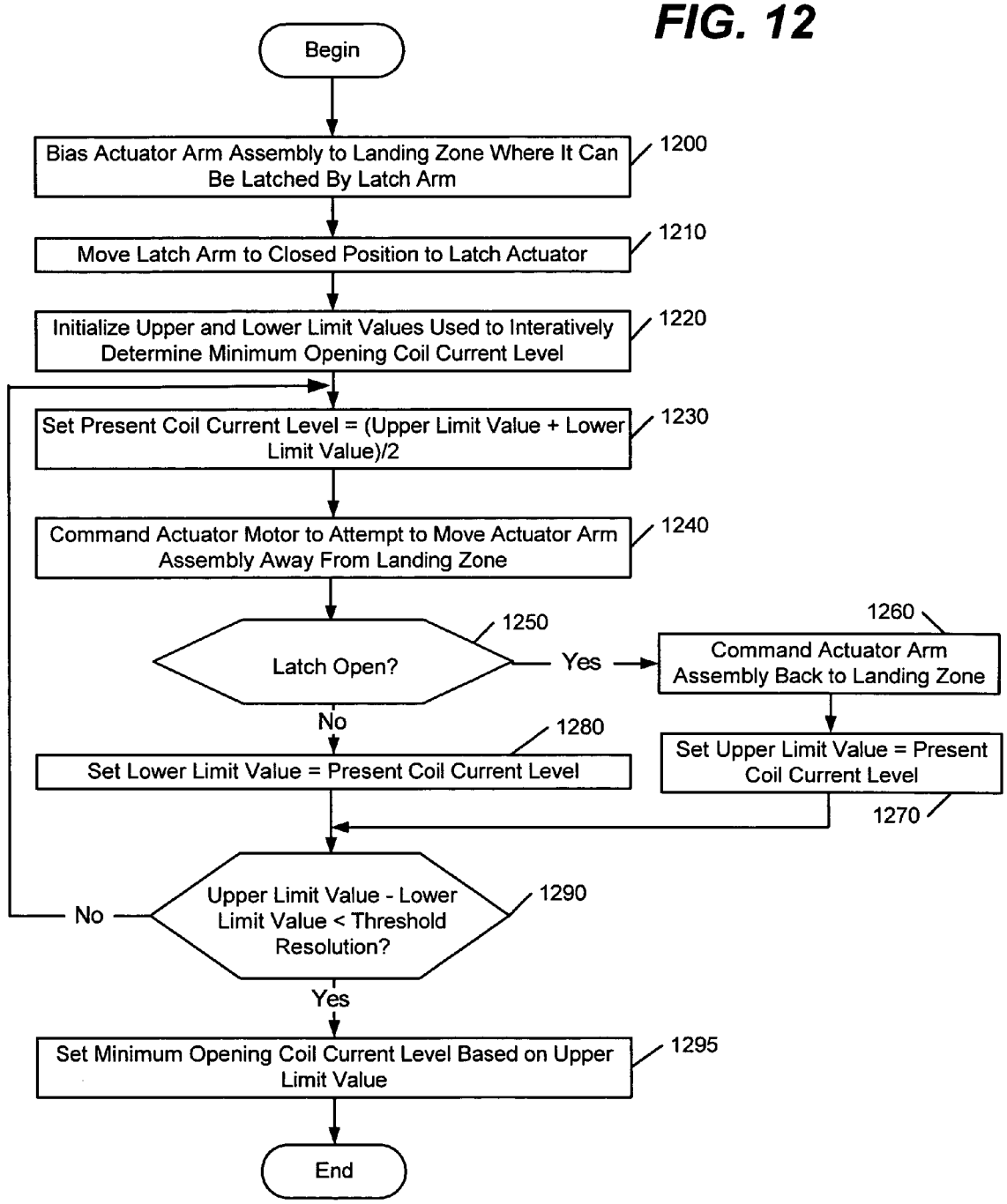
FIG. 12 is a flowchart of operations that may be carried out by the latch control circuit to measure the minimum coil current level that is sufficient to move the latch arm from the closed position to the open position according to some embodiments of the present invention.

FIG. 12 is a flowchart of operations that may be carried out by the latch control circuit 520 to measure the minimum coil current level that is sufficient to move the latch arm 512 from the closed position to the open position according to some embodiments of the present invention. The actuator arm assembly 18 is positioned in (biased to) the landing zone 530 at Block 1200. The latch arm 512 is moved to the closed position at Block 1210 to latch the actuator arm assembly 18. Upper and lower limit values that are used to iteratively determine the minimum coil current level are initialized to defined values at Block 1220. The current coil current level is set to an average of the upper and lower limit values at Block 1230. The actuator motor 28 is commanded at Block 1240 to attempt to move the actuator arm assembly 18 away from the landing zone 530. A decision is made at Block 1250 as to whether the latch 510 is open and the actuator arm assembly 18 has been moved from the landing zone 530.

This determination can be made by measuring the back EMF on the actuator motor 28 and/or based on integration of the back EMF. More particularly, when the back EMF or its integrated value increase more than a threshold value, which is related to an amount of clearance within the latch 510 for which the actuator arm assembly 18 can be moved while the latch 510 is closed, the latch 510 is determined to be open. Otherwise when the measured back EMF/integrated value has less than a threshold increase, the latch 510 is determined to be closed. The back EMF is proportional to actuator velocity and its integrated value indicates a distance that the actuator arm assembly 18 has moved. When the actuator arm assembly 18 has moved a distance that is greater than the clearance within the latch 510, the latch 510 is determined to be open. When the latch 510 is open, the actuator motor 28 is commanded at Block 1260 to move the actuator arm assembly 18 back to the landing zone 530, and the upper limit value is set equal to the present coil current level at Block 1270. When the latch 510 is determined to be closed, the lower limit value is set equal to the present coil current level at Block 1280. A decision is made at Block 1290 as to whether the difference between the upper and lower limit values is less than a threshold resolution and, if not, the operations of Blocks 1230–1280 are repeated until the threshold resolution is determined at Block 1290 to have been achieved. The minimum open coil current level is then set based on the upper limit value at Block 1295.

Figure 13:
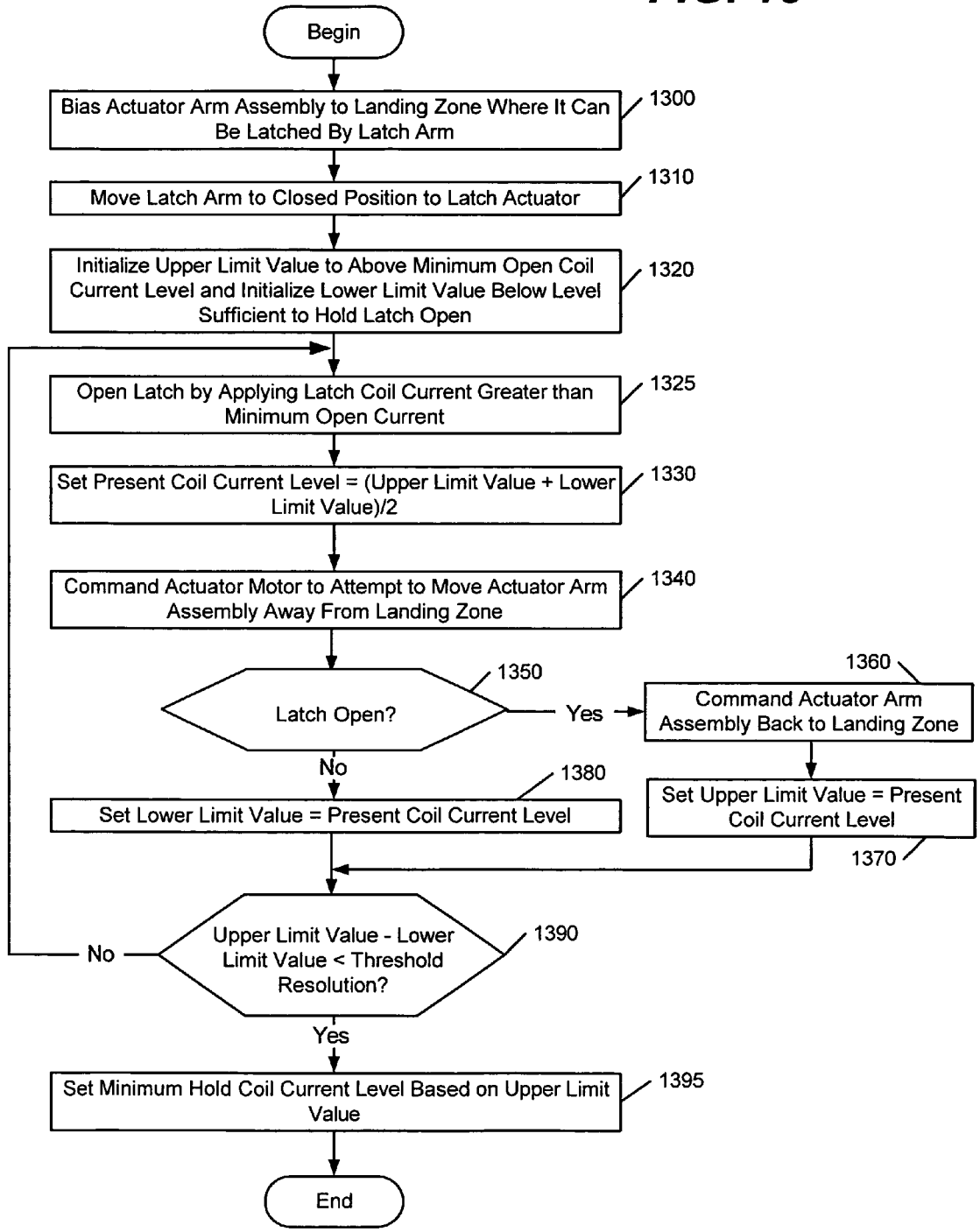
FIG. 13 is a flowchart of operations that may be carried out by the latch control circuit to measure the minimum hold coil current level that is sufficient to hold the latch arm in the open position according to some embodiments of the present invention.

FIG. 13 is a flowchart of operations that may be carried out by the latch control circuit 520 to measure the minimum hold coil current level that is sufficient to hold the latch arm 512 in the open position according to some embodiments of the present invention. The actuator arm assembly 18 is positioned in (biased to) the landing zone 530 at Block 1300. The latch arm 512 is moved to the closed position at Block 1310 to latch the actuator arm assembly 18. Upper and lower limit values that are used to iteratively determine the minimum hold coil current level are initialized to defined values at Block 1320. The upper limit value may be set greater than the minimum opening coil current level sufficient to open the latch 510 by moving the latch arm 512 from the closed position toward the open position. The lower limit value may be set below a level that is sufficient to hold the latch 510 open. The latch arm 512 is moved (or maintained) in the open position at Block 1325 by applying a latch coil current that is greater than the minimum open coil current. The current coil current level is set to an average of the upper and lower limit values at Block 1330. The actuator motor 28 is commanded at Block 1340 to attempt to move the actuator arm assembly 18 away from the landing zone 530. A decision is made at Block 1350 as to the latch is open and the actuator arm assembly 18 has been moved from the landing zone 530, such as by measuring the back EMF on the actuator motor 28 and/or based on integration of the back EMF as described above with regard to FIG. 12. When the latch 510 is open, the actuator motor 28 is commanded at Block 1360 to move the actuator arm assembly 18 back to the landing zone 530, and the upper limit value is set equal to the present coil current level at Block 1370. When the latch 510 is determined to be closed, the lower limit value is set equal to the present coil current level at Block 1380. A decision is made at Block 1390 as to whether the difference between the upper and lower limit values is less than a threshold resolution and, if not, the operations of Blocks 1325–1380 are repeated until the threshold resolution is determined at Block 1390 to have been achieved. The minimum hold coil current level is then set based on the upper limit value at Block 1395.

In some further embodiments, the latch control circuit 520 is configured to determine a maximum closing coil current level that just allows the latch arm 512 to move from the open position to the closed position. The maximum closing coil current level should be less than the minimum current for holding the latch arm 512 in the open position. The latch control circuit 520 is also configured to generate a current level that is used to close the latch apparatus 510 based on the determined maximum closing coil current level.

Figure 14:
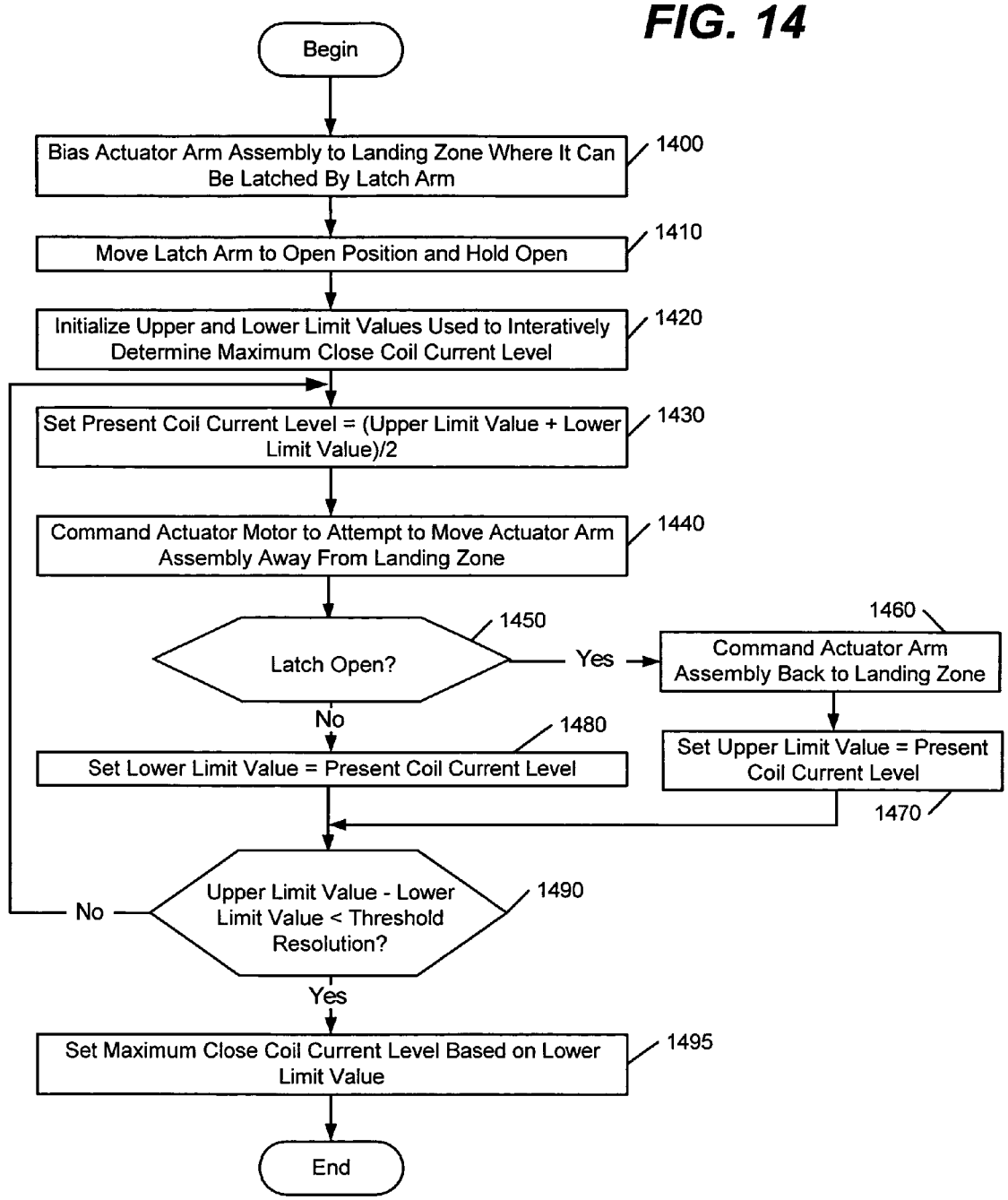
FIG. 14 is a flowchart of operations that may be carried out by the latch control circuit to measure the maximum close coil current level that barely allows the latch arm to move from the open position to the closed position according to some embodiments of the present invention.

FIG. 14 is a flowchart of operations that may be carried out by the latch control circuit 520 to measure the maximum closing coil current level according to some embodiments of the present invention. The actuator arm assembly 18 is positioned in the landing zone 530 at Block 1400 where it can be latched by the latch arm 512. The latch arm 512 is moved to the open position at Block 1410 and held open with a hold current that is greater than the minimum hold current. Upper and lower limit values that are used to iteratively determine the maximum closing coil current level are initialized to defined values at Block 1420. The present coil current level is set to an average of the upper and lower limit values at Block 1430. The actuator motor 28 is commanded at Block 1440 to attempt to move the actuator arm assembly 18 away from the landing zone 530. A decision is made at Block 1450 as to whether the latch 510 is open and the actuator arm assembly 18 has been moved from the landing zone 530, such as based on measurement of the back EMF and/or integration of the back EMF as described above. When the latch 510 is open, the actuator motor 28 is commanded at Block 1460 to move the actuator arm assembly 18 back to the landing zone 530, and the upper limit value is set equal to the present coil current level at Block 1470. When the latch 510 is determined to be closed, the lower limit value is set equal to the present coil current level at Block 1480. A decision is made at Block 1490 as to whether the difference between the upper and lower limit values is less than a threshold resolution and, if not, the operations of Blocks 1430–1480 are repeated until the threshold resolution is determined at Block 1490 to have been achieved. The maximum closing coil current level is then set based on the lower limit value at Block 1495.

As will be appreciated, the latch control circuit 520 may use the operations of FIGS. 12, 13, and 14 to tune the coil current threshold that are used to move and/or hold in place the latch arm 512 based on the measured characteristics of the latch apparatus 510. The latch control circuit 520 may thereby adjust its operation to accommodate variation that can occur between disk drives and that can occur over time. The latch control circuit 520 may measure these characteristics responsive to power-up of the disk drive 10 and/or responsive to other defined events. For example, the latch control circuit 520 may measure during self-test of the disk drive 10 (e.g., during manufacture of the disk drive 10) the minimum coil current level that is sufficient to move the latch arm 512 from the closed position to the open position, and to write an indication of the measured minimum coil current level on the disk 34.

In some other embodiments, the latch control circuit 520 may include a table of different classes of latch apparatuses. The table associates current level values which characterize, for example, the minimum coil current level that is sufficient to move the latch arm 512 from the closed position to the open position, the minimum hold coil current level, and/or other current threshold levels and/or ramp up/down rates. The table may include an identification value that identifies the latch apparatus 510 as a particular one of the classes in the table. The identification value may be set by, for example, a manufacturer of the disk drive based on measurements that were performed on the particular latch apparatus 510 and/or based on a model number or other known characteristic of the latch apparatus 510. The latch control circuit 520 can thereby determine one or more current level values associated with its identified class from the table.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A latch apparatus for latching an actuator arm assembly that positions a read/write head relative to a data storage disk of a disk drive, the latch apparatus comprising:
    a latch arm that is configured to be moved between a closed position that inhibits movement of the actuator arm assembly in a landing zone and an open position that does not inhibit movement of the actuator arm assembly in the landing zone;
    a coil that is configured to generate an electromagnetic force on the latch arm responsive to a coil current;
    a permanent magnet that is configured to generate a magnetic force on the latch arm that is substantially opposed to the electromagnetic force from the coil; and
    a latch control circuit that is configured to increase over a defined opening time period the coil current to at least an upper defined level to cause the coil to move the latch arm from the closed position to the open position, and to decrease over a defined closing time period the coil current to no more than a lower defined level to cause the permanent magnet to move the latch arm from the open position to the closed position,
    wherein the latch control circuit is further configured to reduce the coil current to no less than a defined minimum level until after the latch arm is expected to have reached the closed position after which the latch control circuit further reduces the coil current below the defined minimum level.

2. A latch apparatus for latching an actuator arm assembly that positions a read/write head relative to a data storage disk of a disk drive, the latch apparatus comprising:
    a latch arm that is configured to be moved between a closed position that inhibits movement of the actuator arm assembly in a landing zone and an open position that does not inhibit movement of the actuator arm assembly in the landing zone;
    a coil that is configured to generate an electromagnetic force on the latch arm responsive to a coil current;
    a permanent magnet that is configured to generate a magnetic force on the latch arm that is substantially opposed to the electromagnetic force from the coil; and
    a latch control circuit that is configured to increase over a defined opening time period the coil current to at least an upper defined level to cause the coil to move the latch arm from the closed position to the open position, and to decrease over a defined closing time period the coil current to no more than a lower defined level to cause the permanent magnet to move the latch arm from the open position to the closed position,
    wherein the latch control circuit is further configured to increase the coil current to no more than a defined maximum level until after the latch arm is expected to have reached the open position after which the latch control circuit further increases the coil current above the defined maximum level.

3. A latch apparatus for latching an actuator arm assembly that positions a read/write head relative to a data storage disk of a disk drive, the latch apparatus comprising:
    a latch arm that is configured to be moved between a closed position that inhibits movement of the actuator arm assembly in a landing zone and an open position that does not inhibit movement of the actuator arm assembly in the landing zone;
    a coil that is configured to generate an electromagnetic force on the latch arm responsive to a coil current;
    a permanent magnet that is configured to generate a magnetic force on the latch arm that is substantially opposed to the electromagnetic force from the coil; and
    a latch control circuit that is configured to increase over a defined opening time period the coil current to at least an upper defined level to cause the coil to move the latch arm from the closed position to the open position, and to decrease over a defined closing time period the coil current to no more than a lower defined level to cause the permanent magnet to move the latch arm from the open position to the closed position,
    wherein the latch control circuit is further configured to move the latch arm from the closed position to the open position by increasing the coil current to at least a first level to accelerate the latch arm toward the open position over a first time period, and to reduce the coil current to no more than a second level that is sufficiently below the first level to cause the permanent magnet to decelerate the latch arm while the latch arm continues moving toward the open position during a second time period that follows the first time period.

4. The latch apparatus of claim 3, wherein the permanent magnet is attached to the latch arm.

5. The latch apparatus of claim 3, wherein after the latch control circuit causes the latch arm to be moved from the closed position to the open position the latch control circuit is further configured to maintain the latch in the open position for a defined latch-open time period before ramping-down the coil current to return the latch to the closed position.

6. The latch apparatus of claim 5, wherein the opening time period is at least as long as the defined latch-open time period.

7. The latch apparatus of claim 3, wherein the second time period corresponds to an expected length of time for the latch arm to complete movement to the open position, and the latch control circuit is further configured to increase the coil current during a third time period that follows the second time period to more than the first level to ensure that the latch arm is in the open position.

8. The latch apparatus of claim 3, wherein the latch control circuit is further configured to repeat the increasing and subsequent decreasing of the coil current to alternately accelerate and then decelerate the latch arm until the latch arm reaches the open position.

9. A latch apparatus for latching an actuator arm assembly that positions a read/write head relative to a data storage disk of a disk drive, the latch apparatus comprising:
- a latch arm that is configured to be moved between a closed position that inhibits movement of the actuator arm assembly in a landing zone and an open position that does not inhibit movement of the actuator arm assembly in the landing zone;
- a coil that is configured to generate an electromagnetic force on the latch arm responsive to a coil current;
- a permanent magnet that is configured to generate a magnetic force on the latch arm that is substantially opposed to the electromagnetic force from the coil; and
- a latch control circuit that is configured to increase over a defined opening time period the coil current to at least an upper defined level to cause the coil to move the latch arm from the closed position to the open position, and to decrease over a defined closing time period the coil current to no more than a lower defined level to cause the permanent magnet to move the latch arm from the open position to the closed position,
- wherein the latch control circuit is further configured to move the latch arm from the open position to the closed position by decreasing the coil current to no more than a first level to cause the permanent magnet to accelerate the latch arm toward the closed position over a first time period, and to increase the coil current to at least a second level that is sufficiently above the first level to cause the coil to decelerate the latch arm while it continues moving toward the closed position during a second time period that follows the first time period.

10. The latch apparatus of claim 9, wherein the second time period corresponds to an expected length of time for the latch arm to complete movement to the closed position, and the latch control circuit is further configured to decrease the coil current during a third time period that follows the second time period to less than the first level to ensure that the latch arm is in the closed position.

11. The latch apparatus of claim 10, wherein the latch control circuit is further configured to decrease the coil current during the third time period to about zero.

12. The latch apparatus of claim 9, wherein the latch control circuit is further configured to repeat the decreasing and subsequent increasing of the coil current to alternately accelerate and then decelerate the latch arm until the latch arm reaches the closed position.

13. A latch apparatus for latching an actuator arm assembly that positions a read/write head relative to a data storage disk of a disk drive, the latch apparatus comprising:
- a latch arm that is configured to be moved between a closed position that inhibits movement of the actuator arm assembly in a landing zone and an open position that does not inhibit movement of the actuator arm assembly in the landing zone;
- a coil that is configured to generate an electromagnetic force on the latch arm responsive to a coil current;
- a permanent magnet that is configured to generate a magnetic force on the latch arm that is substantially opposed to the electromagnetic force from the coil; and
- a latch control circuit that is configured to increase over a defined opening time period the coil current to at least an upper defined level to cause the coil to move the latch arm from the closed position to the open position, and to decrease over a defined closing time period the coil current to no more than a lower defined level to cause the permanent magnet to move the latch arm from the open position to the closed position,
- wherein the latch control circuit is further configured to move the latch arm from the closed position to the open position by ramping-up the coil current at a first rate for a first time period and then further ramping-up the coil current at a second rate that is greater than the first rate for a second time period following the first time period.

14. The latch apparatus of claim 13, wherein the latch control circuit is further configured to move the latch arm from the open position to the closed position by ramping-down the coil current at a first rate for a first time period and then further ramping-down the coil current at a second rate that is greater than the first rate for a second time period following the first time period.

15. A latch apparatus for latching an actuator arm assembly that positions a read/write head relative to a data storage disk of a disk drive, the latch apparatus comprising:
- a latch arm that is configured to be moved between a closed position that inhibits movement of the actuator arm assembly in a landing zone and an open position that does not inhibit movement of the actuator arm assembly in the landing zone;
- a coil that is configured to generate an electromagnetic force on the latch arm responsive to a coil current;
- a permanent magnet that is configured to generate a magnetic force on the latch arm that is substantially opposed to the electromagnetic force from the coil; and
- a latch control circuit that is configured to increase over a defined opening time period the coil current to at least an upper defined level to cause the coil to move the latch arm from the closed position to the open position, and to decrease over a defined closing time period the coil current to no more than a lower defined level to cause the permanent magnet to move the latch arm from the open position to the closed position,
- wherein the latch control circuit is further configured to measure a minimum coil current level, that is sufficient to move the latch arm from the closed position to the open position, by varying the level of the coil current to identify a minimum level of current through the coil at which a force on the latch arm from the coil sufficiently exceeds a force on the latch arm from the permanent magnet so that the latch arm moves from the closed position adjacent to the permanent magnet to the open position adjacent to the coil.

16. The latch apparatus of claim 15, wherein, with the actuator arm assembly latched by the latch arm in the closed position to inhibit movement of the actuator arm assembly, the latch control circuit is further configured to determine when the latch arm has been moved from the closed position to the open position by commanding an actuator motor to attempt to move the actuator arm assembly away from the latch arm and monitoring a back electromotive force (back EMF) on the actuator motor while varying a level of the coil current until the back EMF and/or an integration of the back EMF increases at least a threshold amount which indicates that the latch has moved to the open position and the actuator arm assembly is being freely moved by the actuator motor.

17. The latch apparatus of claim 15, wherein the latch control circuit is further configured to set the upper defined level, to which the coil current is increased when moving the latch arm from the closed position to the open position, based on the determined minimum coil current level that is sufficient to move the latch arm from the closed position to the open position.

18. The latch apparatus of claim 15, wherein the latch control circuit is further configured to measure in response to power-up of the disk drive the minimum coil current level that is sufficient to move the latch arm from the closed position to the open position.

19. The latch apparatus of claim 15, wherein the latch control circuit is further configured to measure in response to self-test of the disk drive the minimum coil current level that is sufficient to move the latch arm from the closed position to the open position and to write an indication of the measured minimum coil current level on the disk.

20. A latch apparatus for latching an actuator arm assembly that positions a read/write head relative to a data storage disk of a disk drive, the latch apparatus comprising:
 a latch arm that is configured to be moved between a closed position that inhibits movement of the actuator arm assembly in a landing zone and an open position that does not inhibit movement of the actuator arm assembly in the landing zone;
 a coil that is configured to generate an electromagnetic force on the latch arm responsive to a coil current;
 a permanent magnet that is configured to generate a magnetic force on the latch arm that is substantially opposed to the electromagnetic force from the coil; and
 a latch control circuit that is configured to increase over a defined opening time period the coil current to at least an upper defined level to cause the coil to move the latch arm from the closed position to the open position, and to decrease over a defined closing time period the coil current to no more than a lower defined level to cause the permanent magnet to move the latch arm from the open position to the closed position,
 wherein the latch control circuit comprises a table of different classes of latches and associated current level values and an identification value that identifies the latch apparatus as a particular one of the classes of latches in the table, and the latch control circuit is further configured to determine at least one of the upper defined level and the lower defined level based on the identification value and the associated current level value in the table.

21. A latch apparatus for latching an actuator arm assembly that positions a read/write head relative to a data storage disk of a disk drive, the latch apparatus comprising:
 a latch arm that is configured to be moved between a closed position that inhibits movement of the actuator arm assembly in a landing zone and an open position that does not inhibit movement of the actuator arm assembly in the landing zone;
 a coil that is configured to generate an electromagnetic force on the latch arm responsive to a coil current;
 a permanent magnet that is configured to generate a magnetic force on the latch arm that is substantially opposed to the electromagnetic force from the coil; and
 a latch control circuit that is configured to increase over a defined opening time period the coil current to at least an upper defined level to cause the coil to move the latch arm from the closed position to the open position, and to decrease over a defined closing time period the coil current to no more than a lower defined level to cause the permanent magnet to move the latch arm from the open position to the closed position, wherein the latch control circuit is further configured to determine a minimum coil current level that is sufficient to hold the latch arm in the open position and to generate a hold current level based on the determined minimum coil current level, wherein the latch control circuit is further configured to generate a current through the coil having at least the hold current level while the actuator arm assembly is moved to a position where the latch can then be moved to the closed position to engage and inhibit movement of the actuator arm assembly, and wherein the latch control circuit is further configured to vary a current that it generates through the coil to measure the minimum coil current level that is sufficient to hold the latch arm in the open position.

22. The latch apparatus of claim 21, wherein, with the latch arm in the open position and with the actuator arm assembly positioned in the landing zone where it can become latched by the latch arm when the latch arm has moved to the closed position, the latch control circuit is further configured to measure the minimum coil current level that is sufficient to hold the latch arm in the open position by causing an actuator motor to attempt to move the actuator arm assembly away from the landing zone and to return the actuator arm assembly to the landing zone when the actuator arm assembly is successfully moved there from, and by monitoring a back electromotive force (back EMF) on the actuator motor and/or an integration of the back EMF while varying the coil current until a minimum coil current is obtained that can just hold the latch arm in the open position to allow the actuator to move freely in or out of the landing zone.

23. The latch apparatus of claim 21, wherein, with the latch arm in the open position and with the actuator arm assembly positioned in the landing zone where it can become latched by the latch arm when the latch arm has moved to the closed position, the latch control circuit is further configured to measure the maximum closing coil current level that just allows the latch arm to move from the open position to the closed position by causing an actuator motor to attempt to move the actuator arm assembly away from the landing zone and to return the actuator arm assembly to the landing zone when the actuator arm assembly is successfully moved there from, and by monitoring a back electromotive force (back EMF) on the actuator motor and/or an integration of the back EMF while varying the coil current until a maximum coil current is determined that can just allow the latch arm to move from the open position to latch the actuator in the landing zone.

24. A latch apparatus for latching an actuator arm assembly that positions a read/write head relative to a data storage disk of a disk drive, the latch apparatus comprising:
 a latch arm that is configured to be moved between a closed position that inhibits movement of the actuator arm assembly in a landing zone and an open position that does not inhibit movement of the actuator arm assembly in the landing zone;
 a coil that is configured to generate an electromagnetic force on the latch arm responsive to a coil current;
 a permanent magnet that is configured to generate a magnetic force on the latch arm that is substantially opposed to the electromagnetic force from the coil; and
 a latch control circuit that is configured to increase over a defined opening time period the coil current to at least an upper defined level to cause the coil to move the latch arm from the closed position to the open position, and to decrease over a defined closing time period the coil current to no more than a lower defined level to cause the permanent magnet to move the latch arm from the open position to the closed position, wherein the latch control circuit is further configured to determine a minimum coil current level that is sufficient to hold the latch arm in the open position and to generate a hold current level based on the determined minimum coil current level, and wherein the latch control circuit is further configured to decrease the coil current from a level that is a threshold amount greater than the hold current level to a level that is a threshold amount below the hold current level when moving the latch arm from the open position to the closed position.

25. The latch apparatus of claim 24, wherein the latch control circuit is further configured to further decrease the coil current to about zero after the latch arm is expected to have reached the closed position.

* * * * *